(12) United States Patent  
Yamamoto et al.

(10) Patent No.: US 9,543,596 B2  
(45) Date of Patent: Jan. 10, 2017

(54) SEAL MEMBER FOR FUEL CELL AND FUEL CELL SEAL BODY USING SAME

(71) Applicant: Sumitomo Riko Company Limited, Komaki-shi, Aichi (JP)

(72) Inventors: Kenji Yamamoto, Komaki (JP); Hirokazu Hayashi, Komaki (JP); Kaoru Yasui, Komaki (JP); Shinji Kita, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 14/735,562

(22) Filed: Jun. 10, 2015

(65) Prior Publication Data

US 2015/0288004 A1  Oct. 8, 2015

Related U.S. Application Data

(63) Continuation of application No. PCT/JP2013/076383, filed on Sep. 27, 2013.

(30) Foreign Application Priority Data

Mar. 28, 2013  (JP) ................................. 2013-068589

(51) Int. Cl.
*H01M 8/02* (2016.01)
*H01M 8/10* (2016.01)
(Continued)

(52) U.S. Cl.
CPC .......... *H01M 8/0284* (2013.01); *C08K 5/3492* (2013.01); *C08L 23/16* (2013.01);
(Continued)

(58) Field of Classification Search
CPC  H01M 8/0284; H01M 8/0276; H01M 8/1004; H01M 2008/1095; C08K 5/3492; C08K 5/14; C08K 5/3415; C08K 5/34922; C08K 5/5435; C08L 23/16; C08L 61/12; C08L 61/28; Y02E 60/50

See application file for complete search history.

(56) References Cited

U.S. PATENT DOCUMENTS 5,932,659 A   8/1999  Bambara et al.
6,004,647 A  12/1999  Bambara et al.
(Continued)

FOREIGN PATENT DOCUMENTS

JP  H10-139937 A    5/1998
JP  10337830 A  * 12/1998
(Continued)

OTHER PUBLICATIONS

International Preliminary Report on Patentability dated Oct. 8, 2015, issued in counterpart International Application No. PCT/JP2013/076383 (English translation) (7 pages).
(Continued)

*Primary Examiner* — Gregg Cantelmo
(74) *Attorney, Agent, or Firm* — Westerman, Hattori, Daniels & Adrian, LLP

(57) ABSTRACT

A sealing member to be used for sealing a constituent member of a fuel cell is provided, the sealing member including a cross-linked product of a rubber composition, in which the rubber composition contains the following components (A) and (B). With this, rubber elasticity is maintained without being lost even under extremely low temperature conditions, and in the case where the sealing member is used in a fuel cell sealed body, an excellent sealing property is exhibited. (A) a rubber component including at least one of an ethylene-propylene rubber or ethylene-propylene-diene rubber having a ratio of ethylene-
(Continued)

ethylene diad distribution of at most 29 mol %. (B) a cross-linking agent including an organic peroxide.

12 Claims, 2 Drawing Sheets

(51) Int. Cl.
| | |
|---|---|
| C08L 23/16 | (2006.01) |
| C08K 5/14 | (2006.01) |
| C08K 5/34 | (2006.01) |
| C08K 5/54 | (2006.01) |
| C08L 61/12 | (2006.01) |
| C08L 61/28 | (2006.01) |
| C08K 5/3492 | (2006.01) |
| C08K 5/3415 | (2006.01) |
| C08K 5/5435 | (2006.01) |

(52) U.S. Cl.
CPC ....... *H01M 8/0276* (2013.01); *H01M 8/1004* (2013.01); *C08K 5/14* (2013.01); *C08K 5/3415* (2013.01); *C08K 5/34922* (2013.01); *C08K 5/5435* (2013.01); *C08L 61/12* (2013.01); *C08L 61/28* (2013.01); *H01M 2008/1095* (2013.01); *Y02E 60/50* (2013.01)

(56) References Cited

U.S. PATENT DOCUMENTS

| | | | | |
|---|---|---|---|---|
| 6,156,856 A | * | 12/2000 | Saito | C08F 210/06 526/90 |
| 6,214,894 B1 | | 4/2001 | Bambara et al. | |
| 6,331,600 B1 | * | 12/2001 | Galimberti | C08F 210/16 526/160 |
| 6,359,021 B2 | | 3/2002 | Bambara et al. | |
| 6,365,689 B1 | | 4/2002 | Ushioda et al. | |
| 6,531,520 B1 | | 3/2003 | Bambara et al. | |
| 2001/0027221 A1 | | 10/2001 | Bambara et al. | |
| 2007/0129493 A1 | * | 6/2007 | Sahnoune | C08L 23/10 525/191 |
| 2008/0199673 A1 | | 8/2008 | Allgeuer et al. | |
| 2012/0009506 A1 | * | 1/2012 | Tanahashi | H01M 8/0273 429/535 |
| 2013/0157173 A1 | | 6/2013 | Yamamoto et al. | |

FOREIGN PATENT DOCUMENTS

| | | | | |
|---|---|---|---|---|
| JP | EP 1028145 A1 | * | 8/2000 | ............ C08L 23/16 |
| JP | 2000-514476 A | | 10/2000 | |
| JP | 2005-285537 A | | 10/2005 | |
| JP | 2007-262261 A | | 10/2007 | |
| JP | 201018091 A | * | 8/2010 | |
| JP | 2011-1489 A | | 1/2011 | |
| JP | 2011-249283 A | | 12/2011 | |
| JP | 2012-226908 A | | 11/2012 | |
| WO | 99/09079 A1 | | 2/1999 | |
| WO | 2012/144484 A1 | | 10/2012 | |

OTHER PUBLICATIONS

"Initiators for High Polymers", Jun. 1, 2006, retrieved from the Internet: URL:http://neochemical.ru/File/Akzo Data 110407-Initiators for High Polymer.pdf ; cited in the supplemental European Search Report (in English) (18 pages).

Dewar et al., "Factors influencing low temperature performance of EPDM compounds", Rubber World, vol. 232, No. 2, May 1, 2005, pp. 27-38; cited in the supplemental European Search Report (in English) (12 pages).

Supplemental European Search Report dated Nov. 24, 2015 issued in counterpart European application No. 128800330.5 (in English) (11 pages).

Decision to Grant a Patent, mailed on Oct. 7, 2014, issued in counterpart Japanese application No. 2013-068589 (w/ English machine translation (including mailing date of Oct. 7, 2014) and undated English translation retrieved from the Global Dossier Access System (9 pages)).

International Search Report dated Dec. 17, 2013, issued in corresponding application No. PCT/JP2013/076383; with English translation (4 pages).

Japanese Office Action dated Jun. 17, 2014, issued in corresponding Japanese application No. JP2013-068589; with partial English translation and partial English machine translation (4 pages).

Office Action dated Sep. 27, 2016 issued in counterpart European application no. 13880030.5 (in English) (9 pp.).

Vistalon(TM) 2502 Ethylene Propylene Diene Terpolymer Rubber. Datasheet dated Apr. 27, 2012 [online]. ExxonMobil. Retrieved Sep. 19, 2016 from https://exxonmobilchemical.ides.com/en-US/ds244652/Vistalon(TM) 2502.aspx?l=74710&U=0 (in English, 1 page). Cited in European Office Action.

\* cited by examiner

SEAL MEMBER FOR FUEL CELL AND FUEL CELL SEAL BODY USING SAME

RELATED APPLICATION

This application is a continuation of International Application No. PCT/JP2013/76383, filed on Sep. 27, 2013, which claims priority to Japanese Patent Application No. 2013-068589, filed on Mar. 28, 2013, the entire contents of each of which are hereby incorporated by reference.

BACKGROUND

Technical Field

The present invention relates to a sealing member for a fuel cell to be used for sealing a constituent member of a fuel cell such as a metal separator. More particularly, the present invention relates to a sealing member for a fuel cell exhibiting an excellent low-temperature sealing property and a fuel cell sealed body using the same.

Background Art

Fuel cells, which generate electricity through an electrochemical reaction of gases, exhibit high power generation efficiency, and have an extremely small influence on the environment by virtue of discharging a clean gas. Of the fuel cells, a polymer electrolyte fuel cell can be operated at relatively low temperature and has a high power density. Therefore, the polymer electrolyte fuel cell is expected to be used in various applications such as a power source for power generation and a power source for an automobile.

The polymer electrolyte fuel cell includes as a power generation unit a cell including metal separators and a membrane electrode assembly (MEA) or the like sandwiched between the metal separators. The MEA is formed of a polymer membrane (electrolyte membrane) serving as an electrolyte and a pair of electrode catalyst layers [a fuel electrode (anode) catalyst layer and an oxygen electrode (cathode) catalyst layer] arranged on both surfaces of the electrolyte membrane in its thickness direction. Further, a porous layer (gas diffusion layer) for diffusing a gas is arranged on each of surfaces of the pair of electrode catalyst layers. A fuel gas such as hydrogen is supplied to a fuel electrode side, and an oxidant gas such as oxygen or air is supplied to an oxygen electrode side. Power is generated through an electrochemical reaction at a three-phase interface between the supplied gas, the electrolyte, and the electrode catalyst layer. The polymer electrolyte fuel cell is constructed by securing a cell stack, in which a plurality of the cells are stacked, with end plates or the like arranged at both ends of the cell stack in a cell stacking direction.

In addition, the metal separators each include a flow passage for the gas to be supplied to each of the electrodes and a flow passage for a cooling medium for alleviating heat to be generated during the power generation. In addition, it is necessary to keep the electrolyte membrane in a wet state at the time of operation, because the electrolyte membrane exhibits proton conductivity in a state of containing water. Therefore, in order to prevent the gases from being mixed with each other, prevent leakage of the gases and cooling medium, and keep an inside of the cell in a wet state, it is important to ensure a sealing property at a periphery of the MEA and porous layers or a sealing property between the metal separators adjacent to each other. As a sealing member for sealing such constituent member, there has been proposed, for example, an adhesive sealing member for a fuel cell that ensures a sealing property with the constituent member such as a metal separator without applying an adhesive agent (free of an adhesive agent) by kneading an adhesive component such as a resorcinol-based compound into a rubber component such as an ethylene-propylene rubber (EPM) or an ethylene-propylene-diene rubber (EPDM) and thereby allowing the sealing member itself to have adhesiveness (see JP-A-2011-249283). Further, such sealing member has a risk of losing rubber elasticity of the EPM or EPDM at extremely low temperature, and hence it is difficult to ensure a desired sealing property in the case of using a fuel cell in cold climates or the like. Accordingly, there have been investigations on development of a sealing member capable of exhibiting a satisfactory sealing property even at extremely low temperature. For example, there has been proposed an adhesive sealing member for a fuel cell including a rubber component formed of at least one of an EPM or EPDM having a content of ethylene of at most 53 wt %, an organic peroxide having a 1 hour half-life temperature of at most 130° C., a cross-linking aid, and a specific adhesive component (see JP-A-2012-226908).

SUMMARY OF INVENTION

However, even the adhesive sealing member for a fuel cell disclosed in JP-A-2012-226908 still exhibits an insufficient sealing property at extremely low temperature. Actually, there is a demand for a sealing member capable of ensuring a satisfactory sealing property even under severely low temperature conditions.

In view of the above-mentioned circumstances, a sealing member for a fuel cell exhibiting an excellent sealing property even under extremely low temperature conditions is provided, and a fuel cell sealed body using the same is provided.

The inventors of the present invention have made diligent studies in order to obtain a sealing member for a fuel cell capable of exhibiting a satisfactory sealing property even under severer low temperature conditions. In the course of the studies, the inventors have focused attention on a rubber component, which is a constituent component of a rubber composition for forming the sealing member, and at first, made investigations to discover the cause of deterioration in the low-temperature sealing property in an EPM and an EPDM, which are hitherto used rubber components. As a result, the inventors have found that rubber elasticity is reduced owing to crystallization of a polymer at low temperature, and thereby the sealing property is reduced. As a result of further studies based on the finding, the inventors have focused attention on the fact that an ethylene structural unit in the rubber component has a high crystallinity, and that as the content of the ethylene structural unit is higher and its ethylene chain is longer, the polymer is more liable to be crystallized owing to orientation of its main chain at low temperature, and found out that, when the rubber component to be used contains an ethylene chain having low continuity, the rubber component is less liable to be crystallized even at low temperature and the sealing property becomes satisfactory. In this context, the inventors have found that, when a rubber component (A) including at least one of an EPM or EPDM having a ratio of ethylene-ethylene diad distribution of at most 29 mol % is used together with a cross-linking agent (B) including an organic peroxide, the crystallization of the polymer is suppressed even under extremely low temperature conditions, and the intended object can be achieved. Thus, the present invention has been accomplished.

That is, a first aspect of the present invention resides in a sealing member for a fuel cell to be used for sealing a constituent member of a fuel cell, the sealing member including a cross-linked product of a rubber composition, in which the rubber composition contains the following components (A) and (B):

(A) a rubber component including at least one of an ethylene-propylene rubber or ethylene-propylene-diene rubber having a ratio of ethylene-ethylene diad distribution of at most 29 mol %; and (B) a cross-linking agent including an organic peroxide.

Further, a second aspect of the present invention resides in a fuel cell sealed body, including a constituent member of a fuel cell and a sealing member bonded to each other through an adhesive layer, or including sealing members bonded to each other through an adhesive layer, in which the sealing member includes the sealing member for a fuel cell of the first aspect.

In addition, a third aspect of the present invention resides in a fuel cell sealed body, including a constituent member of a fuel cell and a sealing member directly bonded to each other, or including sealing members directly bonded to each other, in which the sealing member includes the sealing member for a fuel cell of the first aspect.

As described above, the sealing member for a fuel cell of the embodiment of the present invention is the sealing member for a fuel cell to be used for sealing a constituent member of a fuel cell, the sealing member including a cross-linked product of a rubber composition, in which the rubber composition contains: a rubber component (A) including at least one of an ethylene-propylene rubber or ethylene-propylene-diene rubber having a ratio of ethylene-ethylene diad distribution of at most 29 mol %; and a cross-linking agent (B) including an organic peroxide. With this, rubber elasticity is maintained without being lost even under extremely low temperature conditions, and in the case where the sealing member for a fuel cell is used in the fuel cell sealed body, an excellent sealing property is exhibited.

When a rubber component including at least one of an ethylene-propylene rubber or ethylene-propylene-diene rubber having a ratio of ethylene-ethylene-ethylene triad distribution of at most 27 mol % as well as having a ratio of ethylene-ethylene diad distribution of at most 29 mol % is used as the rubber component (A), a further improvement in low-temperature sealing property is realized.

In addition, when the rubber composition contains a specific adhesive component (C) described later together with the specific rubber component (A) and the specific cross-linking agent (B) described above, the sealing member for a fuel cell exhibits satisfactory adhesiveness to the adhesive layer, and adhesion reliability is improved. In addition to an effect of improving an adhesive force resulting from the specific adhesive component (C) to be contained, the adhesive force is less liable to be reduced even in an operating environment of a fuel cell. In consequence, by using the fuel cell sealed body of the embodiment of the present invention, a more satisfactory sealing property is ensured even when a fuel cell is operated for a long time period. That is, operational reliability of a fuel cell can be improved.

As described above, the fuel cell sealed body of the embodiments of the present invention includes the constituent member of a fuel cell and the specific sealing member described above bonded to each other through the adhesive layer or directly bonded each other, or the specific sealing members bonded to each other through the adhesive layer or directly bonded each other. Therefore, the fuel cell sealed body exhibits high adhesion reliability.

DETAILED DESCRIPTION OF PARTICULAR EMBODIMENTS

Figure 1:
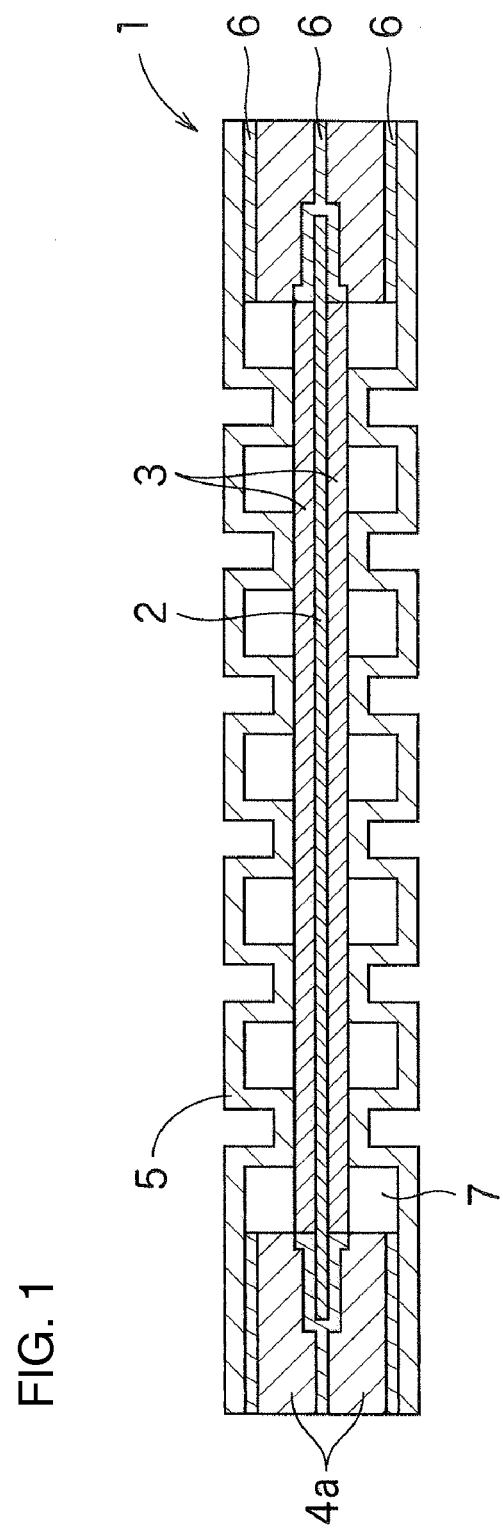
FIG. 1 is a sectional view for illustrating an example of a fuel cell sealed body of the embodiment of the present invention.

Embodiments of the present invention are hereinafter described in detail. It should be noted that the present invention is not limited to these embodiments.

A sealing member for a fuel cell of the embodiment of the present invention (hereinafter sometimes referred to simply as "sealing member") is used for sealing a constituent member of a fuel cell. The sealing member for a fuel cell uses a rubber composition containing the following components (A) and (B), and is formed of a cross-linked product obtained by cross-linking the rubber composition:

(A) a rubber component including at least one of an ethylene-propylene rubber or ethylene-propylene-diene rubber having a ratio of ethylene-ethylene diad distribution of at most 29 mol %; and (B) a cross-linking agent including an organic peroxide.

<<Specific Rubber Component (A)>>

The specific rubber (A) is a main component of the rubber composition and generally accounts for over half of the whole rubber composition.

As the specific rubber component (A), the ethylene-propylene rubber (EPM) and the ethylene-propylene-diene rubber (EPDM) are used. Those rubbers are used alone or in combination of the two kinds.

In addition, the rubber component needs to have a ratio of ethylene-ethylene diad distribution of at most 29 mol % with respect to all diad distributions (the total of the ratio of propylene-propylene diad distribution, the ratio of ethylene-propylene diad distribution, and the ratio of ethylene-ethylene diad distribution). The ratio of ethylene-ethylene diad distribution is more preferably at most 26 mol %, particularly preferably at most 24 mol %. In addition, a lower limit of the ratio of ethylene-ethylene diad distribution is 15 mol %. That is, when the ratio of ethylene-ethylene diad distribution exceeds the specific ratio, an ethylene chain becomes longer and a polymer is more liable to form a crystalline structure owing to orientation of its main chain, resulting in a reduction in low-temperature sealing property. Further, the rubber component has a ratio of ethylene-ethylene-ethylene triad distribution of preferably at most 27 mol %, more preferably at most 25 mol %, particularly preferably at most 22 mol %, with respect to all triads (the total of the ratio of propylene-propylene-propylene triad distribution, the ratio of propylene-propylene-ethylene triad distribution, the ratio of ethylene-propylene-ethylene triad distribution, the ratio of propylene-ethylene-propylene triad distribution, the ratio of ethylene-ethylene-propylene triad distribution, and the ratio of ethylene-ethylene-ethylene triad distribution), in addition to the ratio of ethylene-ethylene diad distribution as described above. In addition, a lower limit of the ratio of ethylene-ethylene-ethylene triad distribution is 15 mol %. When the ratio of ethylene-ethylene-ethylene triad distribution is set to the specific ratio in addition to the ratio of ethylene-ethylene diad distribution, an effect of further improving the low-temperature sealing property is achieved. It should be noted that the ratio of ethylene-ethylene diad distribution is not intended to include the ratio of ethylene-ethylene-ethylene triad distribution.

For example, the content of ethylene-ethylene diad distribution (mol %) may be measured and calculated as described below. Specifically, taking an EPDM as an example, the EPDM after being vulcanized is first swelled with a solvent (a mixed solvent of o-dichlorobenzene/benzene-d6), and then measured for its $^{13}$C-NMR spectrum. Then, the content of ethylene-ethylene diad distribution is calculated based on the measurement result of the $^{13}$C-NMR spectrum. At this time, the following items are calculated based on the sum of peak areas obtained by the measurement. It should be noted that the letter "S" in the following equations means methylene.

$$\text{Propylene-propylene diad(PP)} = S\alpha\alpha$$

$$\text{Ethylene-propylene diad(EP)} = S\alpha\gamma + S\alpha\delta$$

$$\text{Ethylene-ethylene diad(EE)} = \tfrac{1}{2}(S\beta\gamma + S\delta\delta) + \tfrac{1}{4}(S\gamma\gamma)$$

It should be noted that, in the equations, the symbols are as follows:
Sαα: around 44 ppm to 48 ppm
Sαγ+Sαδ: around 37 ppm to 39 ppm
Sβγ: around 27.4 ppm to 28.0 ppm
Sδδ: around 29.5 ppm to 30.0 ppm
Sγδ: around 30.0 ppm to 30.4 ppm
Greek letters in the equations each represent the position of a carbon atom of methylene between carbon atoms in a main chain each having bonded thereto a methyl group, the two methyl groups bonded to the carbon atoms having a shortest distance therebetween. The position of a carbon atom adjacent to the carbon atom having bonded thereto a methyl group is represented by α. For example, when a carbon atom in the main chain is adjacent to the carbon atom having bonded thereto one of the methyl groups and is the third from the carbon atom having bonded thereto the other methyl group, the position of the carbon atom is represented by αγ.

In addition, normalization is performed so that the sum of the content of the PP, the content of the EP, and the content of the EE becomes 100%, and the contents of diad distribution for the PP, the EP, and the EE are calculated. Thus, the content of ethylene-ethylene diad (EE) distribution (mol %) can be calculated.

The content of ethylene-ethylene diad distribution (mol %) may be measured by using a vulcanized rubber after vulcanization as described above, or by using an unvulcanized rubber before vulcanization.

In addition, for example, the content of ethylene-ethylene-ethylene triad distribution (mol %) may be measured and calculated as described below. Specifically, taking an EPDM as an example, the unvulcanized EPDM serving as a raw material is first swelled with a solvent (a mixed solvent of o-dichlorobenzene/benzene-d6), and then measured for its $^{13}$C-NMR spectrum. Then, the content of ethylene-ethylene-ethylene triad distribution is calculated based on the measurement result of the $^{13}$C-NMR spectrum. At this time, the following items are calculated based on the sum of peak areas obtained by the measurement. It should be noted that the letters "S" and "T" in the following equations mean methylene and methine, respectively.

$$\text{Propylene-propylene-propylene triad(PPP)} = T\beta\beta$$

$$\text{Propylene-propylene-ethylene triad(PPE)} = T\beta\delta$$

$$\text{Ethylene-propylene-ethylene triad(EPE)} = T\delta\delta$$

$$\text{Propylene-ethylene-propylene triad(PEP)} = S\beta\beta$$

$$\text{Ethylene-ethylene-propylene triad(EEP)} = S\beta\delta$$

$$\text{Ethylene-ethylene-ethylene triad(EEE)} = \tfrac{1}{2}(S\delta\delta) + \tfrac{1}{4}(S\gamma\delta)$$

It should be noted that, in the equations, the symbols are as follows:
Tββ: around 28.0 ppm to 28.8 ppm
Tβδ: around 30.55 ppm to 30.8 ppm
Tδδ: around 33 ppm
Sββ: around 24 ppm to 25 ppm
Sβδ: around 26.5 ppm to 27.4 ppm
Sδδ: around 29.5 ppm to 30.0 ppm
Sγδ: around 30.0 ppm to 30.4 ppm
Greek letters in the equations each represent, as in the diad distributions, the position of a carbon atom of methylene between carbon atoms in a main chain each having bonded thereto a methyl group, the two methyl groups bonded to the carbon atoms having a shortest distance therebetween. The position of a carbon atom adjacent to the carbon atom having bonded thereto a methyl group is represented by α. For example, when a carbon atom in the main chain is adjacent to the carbon atom having bonded thereto one of the methyl groups and is the third from the carbon atom having bonded thereto the other methyl group, the position of the carbon atom is represented by αγ. In addition, the same holds true for methine (T).

In addition, normalization is performed so that the sum of the content of the PPP, the content of the PPE, the content of the EPE, the content of the PEP, the content of the EEP, and the content of the EEE becomes 100%, and the contents of triad distribution for the PPP, the PPE, the EPE, the PEP, the EEP, and the EEE are calculated. Thus, the content of ethylene-ethylene-ethylene triad (EEE) distribution (mol %) can be calculated.

As described above, the content of ethylene-ethylene-ethylene triad distribution (mol %) may be measured by using an unvulcanized rubber before vulcanization.

Further, as the EPM and the EPDM have a smaller content of ethylene in addition to the ratios of diad distribution and triad distribution specified as described above, the EPM and the EPDM are less liable to be crystallized at an extremely low temperature of from about −20° C. to −30° C. That is, the EPM and EPDM having a small content of ethylene are less liable to be reduced in rubber elasticity even at extremely low temperature. Therefore, the content of ethylene in the EPM and the EPDM is preferably at most 60 wt %, particularly preferably at most 53 wt %, from the viewpoint of improving the sealing property at extremely low temperature. In contrast, when the content of ethylene is too small, the physical properties of the rubber are reduced, and it becomes difficult to ensure elongation characteristics or tensile characteristics required for the sealing member. Therefore, the content of ethylene is preferably at least 40 wt %.

In addition, from the viewpoints of acid resistance and water resistance of a fuel cell in its operating environment, it is preferred to use the EPDM as the specific rubber component (A). In particular, as the amount of diene becomes larger in the EPDM, a cross-linking density in the sealing member, which is a cross-linked product, becomes higher proportionately, resulting in a further improvement in low-temperature sealing property. In view of the foregoing, the amount of diene in the EPDM (mass ratio of a diene component) falls within a range of preferably from 1 wt % to 20 wt %, more preferably from 3 wt % to 15 wt %.

A preferred example of the diene component of the EPDM is a diene-based monomer having 5 to 20 carbon atoms. Specific examples thereof include 1,4-pentadiene, 1,4-hexadiene, 1,5-hexadiene, 2,5-dimethyl-1,5-hexadiene, 1,4-octadiene, 1,4-cyclohexadiene, cyclooctadiene, dicyclopentadiene (DCP), 5-ethylidene-2-norbornene (ENB), 5-butylidene-2-norbornene, 2-methallyl-5-norbornene, and 2-isopropenyl-5-norbornene.

<<Specific Cross-linking Agent (B)>>

The specific cross-linking agent (B) includes an organic peroxide. Examples of the organic peroxide include a peroxyketal, a peroxyester, a diacyl peroxide, a peroxy dicarbonate, a dialkyl peroxide, and a hydroperoxide. Those organic peroxides are used alone or in combination of two or more kinds. Of those organic peroxides, for example, an organic peroxide having a 1 hour half-life temperature of at most 160° C. is preferably used. In order to bond the sealing member and an electrolyte membrane to each other, an organic peroxide having a 1 hour half-life temperature of at most 130° C. is preferably used. Further, at least one of a peroxyketal or peroxyester having a 1 hour half-life temperature of at least 100° C. is preferred in view of ease of cross-linking at a temperature of about 130° C. and excellent handleability of the rubber composition after kneading having added thereto such cross-linking agent. At least one of a peroxyketal or peroxyester having a 1 hour half-life temperature of at least 110° C. is particularly preferred. In addition, the cross-linking can be accomplished in a shorter time period by using the peroxyester.

In the embodiment of the present invention, in relation to the cross-linking agent (B), the "half-life" of the organic peroxide having a 1 hour half-life temperature of at most 160° C. refers to a time period in which the concentration of the organic peroxide (amount of active oxygen) is reduced to half of its initial value. Therefore, the "half-life temperature" is used as an indicator of the decomposition temperature of the organic peroxide. The "1 hour half-life temperature" refers to a temperature at which the half-life becomes 1 hour. That is, as the 1 hour half-life temperature is lower, the organic peroxide is decomposed at a lower temperature. For example, when the organic peroxide having a 1 hour half-life temperature of at most 160° C. is used, the cross-linking can be accomplished at a lower temperature (specifically, at most 150° C.) and in a shorter time period. Therefore, a fuel cell sealed body of the embodiment of the present invention can be used even in the vicinity of the electrolyte membrane of a polymer electrolyte fuel cell, for example.

Examples of the peroxyketal include
n-butyl-4,4-di(t-butylperoxy)valerate,
2,2-di(t-butylperoxy)butane,
2,2-di(4,4-di(t-butylperoxy)cyclohexyl)propane,
1,1-di(t-butylperoxy)cyclohexane,
1,1-di(t-hexylperoxy)cyclohexane,
1,1-di(t-hexylperoxy)-3,3,5-trimethylcyclohexane, and
1,1-di(t-butylperoxy)-2-methylcyclohexane.

Examples of the peroxyester include t-butyl peroxybenzoate, t-butyl peroxyacetate, t-hexyl peroxybenzoate, 2,5-dimethyl-2,5-di(benzoylperoxy)hexane, t-butyl peroxy-2-ethylhexyl monocarbonate, t-butylperoxylaurate, t-butyl peroxyisopropylmonocarbonate, t-butyl peroxy-3,5,5-trimethylhexanoate, t-butyl peroxymaleic acid, and t-hexyl peroxyisopropylmonocarbonate.

Of those, 1,1-di(t-butylperoxy)cyclohexane, t-butyl peroxyacetate, or t-butyl peroxyisopropylmonocarbonate is preferred because of a relatively rapid reaction thereof with the specific rubber component (A). Of those, the cross-linking can be accomplished in a shorter time period by using t-butyl peroxyisopropylmonocarbonate.

The amount of the specific cross-linking agent (B) (in the case of an active ingredient having a purity of 100%) to be blended preferably falls within a range of from 0.4 part by weight to 12 parts by weight with respect to 100 parts by weight of the specific rubber component (A). When the amount of the specific cross-linking agent (B) to be blended is too small, it tends to be difficult to allow a cross-linking reaction to sufficiently proceed. When the amount of the specific cross-linking agent (B) to be blended is too large, there is a tendency that the cross-linking density increases in the cross-linking reaction and thereby elongation is reduced.

<<Specific Adhesive Component (C)>>

In the embodiment of the present invention, a specific adhesive component (C) is preferably used in the rubber composition, in addition to the specific rubber component (A) and the specific cross-linking agent (B) described above. As the specific adhesive component (C), at least one selected from the group consisting of a resorcinol-based compound, a melamine-based compound, an aluminate-based coupling agent, and a silane coupling agent is used.

Examples of the resorcinol-based compound include resorcin, a modified resorcin-formaldehyde resin, and a resorcin-formaldehyde (RF) resin. Those compounds are used alone or in combination of two or more kinds. Of those, a modified resorcin-formaldehyde resin is preferred in view of its low volatility, low hygroscopicity, and excellent compatibility with the rubber. Examples of the modified resorcin-formaldehyde resin include resins represented by the following general formulae (1) to (3). Resins represented by the following general formula (1) are particularly preferred.

(1)

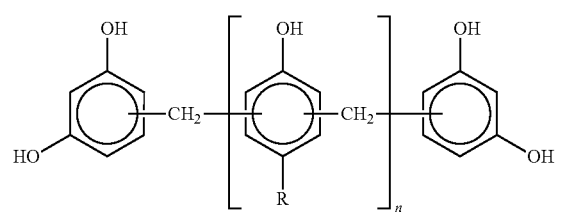

[Where R represents a hydrocarbon group, and n represents an integer.]

(2)

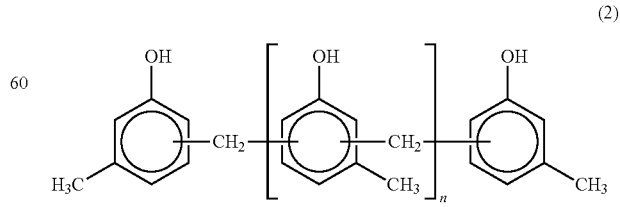

[Where n represents an integer.]

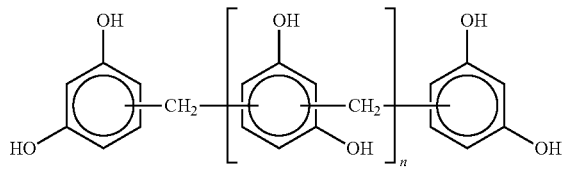

(3)

[Where n represents an integer.]

The amount of the resorcinol-based compound to be blended falls within a range of preferably from 0.1 part by weight to 30 part by weight, particularly preferably from 1 part by weight to 15 parts by weight, with respect to 100 parts by weight of the specific rubber component (A). When the amount of the resorcinol-based compound to be blended is too small, it tends to be difficult to obtain a desired adhesive force. When the amount of the resorcinol-based compound to be blended is too large, the physical properties of the rubber tend to be reduced.

Examples of the melamine-based compound include: a methylated product of a formaldehyde-melamine polymer; and hexamethylenetetramine. Those compounds are used alone or in combination of two or more kinds. Those compounds are decomposed by heat during the cross-linking and supply formaldehyde to a system. Of those compounds, a methylated product of a formaldehyde-melamine polymer is preferred in view of its low volatility, low hygroscopicity, and excellent compatibility with the rubber. For example, a preferred example of the methylated product of a formaldehyde-melamine polymer is a compound represented by the following general formula (4). A mixture containing 43 wt % to 44 wt % of a compound represented by the general formula (4) in which n=1, 27 wt % to 30 wt % of a compound represented by the general formula (4) in which n=2, and 26 wt % to 30 wt % of a compound represented by the general formula (4) in which n=3 is particularly preferred.

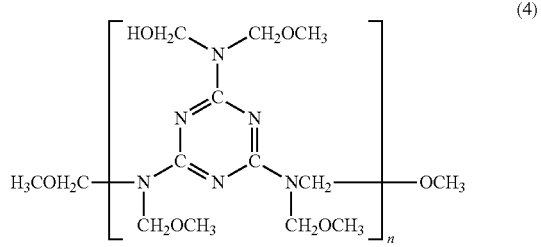

(4)

[Where n represents an integer.]

Herein, in the case of using the resorcinol-based compound and the melamine-based compound in combination, the blended ratio of the resorcinol-based compound:the melamine-based compound falls within a range of preferably from 1:0.5 to 1:2, particularly preferably from 1:0.77 to 1:1.5, in terms of weight ratio. When the blended ratio of the melamine-based compound is too low, the tensile strength, elongation, and the like of the rubber tend to be reduced slightly. When the blended ratio of the melamine-based compound is too high, the adhesive force is saturated, and hence further blending entails a higher cost.

The aluminate-based coupling agent may be appropriately selected from organic aluminum compounds each having a hydrolyzable alkoxy group and a moiety having an affinity for the rubber component in consideration of adhesiveness and the like. Examples of the aluminate-based coupling agent include an aluminum alkyl acetoacetate diisopropylate, aluminum ethylacetoacetate diisopropylate, aluminum tris-ethylacetoacetate, aluminum isopropylate, aluminum diisopropylate mono-sec-butyrate, aluminum sec-butyrate, aluminum ethylate, aluminum bisethylacetoacetate-monoacetyl acetonate, aluminum trisacetyl acetonate, and aluminum monoisopropoxy monooreoxy ethylacetoacetate. Those compounds are used alone or in combination of two or more kinds. Of those, an aluminum alkyl acetoacetate diisopropylate, aluminum ethylacetoacetate diisopropylate, or aluminum tris-ethylacetoacetate is preferred.

The amount of the aluminate-based coupling agent to be blended falls within a range of preferably from 0.5 part by weight to 20 parts by weight, particularly preferably from 3 parts by weight to 15 parts by weight, with respect to 100 parts by weight of the specific rubber component (A). When the amount of the aluminate-based coupling agent to be blended is too small, it tends to be difficult to obtain the desired adhesive force. When the amount of the aluminate-based coupling agent to be blended is too large, there are tendencies that the physical properties of the rubber are reduced, and processability is reduced as well.

The silane coupling agent may be appropriately selected from compounds each having an epoxy group, an amino group, a vinyl group, or the like as a functional group in consideration of adhesiveness and the like. Examples of the silane coupling agent include vinyltrimethoxysilane, vinyltriethoxylsilane, vinyl-tris(2-methoxyethoxy) silane, 3-methacryloxypropyltrimethoxysilane, 3-methacryloxypropyltriethoxylsilane, 3-glycidoxypropyltrimethoxysilane, 3-glycidoxypropyltriethoxylsilane, 3-glycidoxypropylmethyldiethoxysilane, 2-(3,4-epoxycyclohexyl)ethyltrimethoxysilane, N-2 (aminoethyl) 3-aminopropyltrimethoxysilane, 3-aminopropyltrimethoxysilane, and N-phenyl-3-aminopropyltrimethoxysilane. In addition, oligomers in which those compounds are bound may be used to prevent volatilization thereof. Those compounds are used alone or in combination of two or more kinds. Of those, when one or more compounds selected from compounds each having an epoxy group or a vinyl group are used, the adhesive force is improved, and the adhesive force is less liable to be reduced even in an operating environment of a fuel cell. Specifically, 3-glycidoxypropyltrimethoxysilane, 3-glycidoxypropyltriethoxylsilane, 3-glycidoxypropylmethyldiethoxysilane, 2-(3,4-epoxycyclohexyl)ethyltrimethoxysilane, vinyltrimethoxysilane, vinyltriethoxylsilane, vinyl-tris(2-methoxyethoxy)silane, and the like are preferred.

The amount of the silane coupling agent to be blended falls within a range of preferably from 0.5 part by weight to 20 parts by weight, particularly preferably from 5 parts by weight to 10 parts by weight, with respect to 100 parts by weight of the specific rubber component (A). When the amount of the silane coupling agent to be blended is too small, it tends to be difficult to obtain the desired adhesive force. When the amount of the silane coupling agent to be blended is too large, there are tendencies that the physical properties of the rubber are reduced, and processability is reduced as well.

It should be noted that, in the rubber composition to be used for the sealing member of the embodiment of the present invention, there may be blended various additives to be generally used in the rubber composition, such as a cross-linking aid (D), a softening agent, a reinforcing agent, a plasticizer, an antioxidant, a tackifier, and a processing aid, in addition to the components (A) and (B), and further the component (C).

<<Cross-linking Aid (D)>>

Examples of the cross-linking aid include a maleimide compound, triallyl cyanurate (TAC), triallyl isocyanurate (TRIC), and trimethylolpropane trimethacrylate (TMPT). One kind of these aids is used alone, or two or more kinds thereof are used in combination. Of those, a maleimide compound is preferably used because of its high effects of improving the cross-linking density and strength.

The amount of the cross-linking aid (D) to be blended preferably falls within a range of from 0.1 part by weight to 3 parts by weight with respect to 100 parts by weight of the specific rubber component (A). When the amount of the cross-linking aid (D) to be blended is too small, it tends to be difficult to allow the cross-linking reaction to sufficiently proceed. When the amount of the cross-linking aid (D) to be blended is too large, there is a tendency that the cross-linking density excessively increases and thereby the adhesive force is reduced.

<<Softening Agent>>

Examples of the softening agent include: a petroleum-based softening agent such as a process oil, a lubricating oil, paraffin, liquid paraffin, or vaseline; a fatty oil-based softening agent such as a castor oil, a linseed oil, a rapeseed oil, or a coconut oil; a wax such as a tall oil, rubber substitute, beeswax, carnauba wax, or lanolin; linoleic acid; palmitic acid; stearic acid; and lauric acid.

The amount of the softening agent to be blended is generally at most 40 parts by weight with respect to 100 parts by weight of the specific rubber component (A).

Of the softening agents, a softening agent having a pour point of at most $-40°$ C. is preferred, and examples thereof include a poly-$\alpha$-olefin, dioctyl phthalate (DOP), dioctyl adipate (DOA), dioctylsebacate (DOS), anddibutylsebacate (DBS). Those softening agents are used alone or in combination of two or more kinds. Of those, a poly-$\alpha$-olefin is preferred because the poly-$\alpha$-olefin has satisfactory compatibility with the specific rubber component (A) and is less liable to bleed. The poly-$\alpha$-olefin is obtained by polymerizing an $\alpha$-olefin having 6 to 16 carbon atoms. As the molecular weight of the poly-$\alpha$-olefin is lower, the poly-$\alpha$-olefin has a lower viscosity and a lower pour point.

As the pour point of the softening agent is lower, the softening agent is less liable to be hardened at extremely low temperature. Therefore, the softening agent having a lower pour point has a higher effect of suppressing crystallization of the rubber component at extremely low temperature. The pour point of the softening agent is more preferably at most $-40°$ C. On the other hand, when the pour point is too low, the softening agent is liable to volatilize at the time of operation of a fuel cell, or the like. Therefore, the pour point of the softening agent is desirably $-80°$ C. or more. It should be noted that the pour point may be measured in accordance with JIS K2269 (1987).

<<Reinforcing Agent>>

Examples of the reinforcing agent include carbon black and silica. The grade of the carbon black is not particularly limited, and may be appropriately selected from, for example, SAF grade, ISAF grade, HAF grade, MAF grade, FEF grade, GPF grade, SRF grade, FT grade, and MT grade.

The amount of the reinforcing agent to be blended falls within a range of generally from 10 parts by weight to 150 parts by weight with respect to 100 parts by weight of the specific rubber component (A).

<<Plasticizer>>

Examples of the plasticizer include: an organic acid derivative such as dioctyl phthalate (DOP); and a phosphoric acid derivative such as tricresyl phosphate.

The amount of the plasticizer to be blended is generally at most 40 parts by weight with respect to 100 parts by weight of the specific rubber component (A).

<<Antioxidant>>

Examples of the antioxidant include a phenol-based antioxidant, an imidazole-based antioxidant, and a wax. The amount of the antioxidant to be blended falls within a range of generally from 0.5 part by weight to 10 parts by weight with respect to 100 parts by weight of the specific rubber component (A).

<Production of Sealing Member for Fuel Cell>

The sealing member for a fuel cell of the embodiment of the present invention may be produced by, for example, preparing the rubber composition containing the specific rubber component (A), the specific cross-linking agent (B), and various additives as required, and then cross-linking the rubber composition. For example, the rubber composition may be prepared as described below. First, materials other than the specific cross-linking agent (B) and further the adhesive component (C) and the cross-linking aid (D), which serve as the additives, are pre-mixed and kneaded at a temperature of from 80° C. to 140° C. for several minutes. Next, the obtained kneaded product is cooled, and the specific cross-linking agent (B), the adhesive component (C) and the cross-linking aid (D), which serve as the additives, are added thereto. Then, the mixture is kneaded with a roll such as an open roll at a roll temperature of from 40° C. to 70° C. for 5 minutes to 30 minutes. It should be noted that the adhesive component (C) may be blended at the stage of the pre-mixing. The resultant is cross-linked under predetermined conditions (130° C. to 190° C.×1 minute to 30 minutes), to provide the sealing member for a fuel cell of the embodiment of the present invention. It is preferred that the sealing member be formed into a predetermined shape corresponding to the shape of a member to be sealed. For example, the sealing member formed into a film shape can be attached to various constituent members of a fuel cell and cross-linked to be bonded thereto with ease. This eliminates the need for complicated position alignment with the constituent members of a fuel cell, and hence continuous processing is facilitated and a further improvement in productivity of a fuel cell can be achieved. Alternatively, the sealing member of the embodiment of the present invention and a constituent member of a fuel cell such as a MEA or a separator may be integrally molded by being placed in a mold together and heated.

Now, as described above, a higher cross-linking density is desired from the viewpoint of suppressing crystallization of the rubber component at extremely low temperature. The cross-linking density may be judged by, for example, using a value of 100% modulus as an indicator. Specifically, the 100% modulus of the sealing member for a fuel cell of the embodiment of the present invention is preferably from 2.0 MPa to 10.0 MPa. When the sealing member has a high cross-linking density to some extent, the rubber elasticity is less liable to be reduced even at extremely low temperature. It should be noted that the 100% modulus is a value obtained by dividing a tensile force of a dumbbell-shaped specimen at 100% elongation by an initial sectional area of the dumbbell-shaped specimen. For example, the 100% modulus may be measured in accordance with JIS K6251 (2010).

<Material for Forming Adhesive Layer>

As a material for forming an adhesive layer, for example, rubber cement or a rubber composition in a liquid form at normal temperature is preferably used. As the rubber composition in a liquid form, there is given a rubber composition containing a rubber component, an organic peroxide (cross-linking agent), and the like. An example of the rubber component is a rubber in a liquid form, and specific examples thereof include a liquid EPM, a liquid EPDM, a liquid acrylonitrile-butadiene rubber (liquid NBR), and a liquid hydrogenated acrylonitrile-butadiene rubber (liquid H-NBR). Those rubbers are used alone or in combination of two or more kinds. Of those rubbers, a liquid EPM or liquid EPDM having a content of ethylene of at most 60 wt %, particularly preferably at most 53 wt % is preferred from the viewpoint of improving the sealing property at extremely low temperature. Alternatively, other than the rubber in a liquid form, a rubber in a solid form at normal temperature may be used as the rubber component.

In addition, as the organic peroxide, the specific cross-linking agent (B) described above may be used. In addition, in the rubber composition for forming an adhesive layer, there may be blended the adhesive component (C), and further various additives to be generally used in the rubber composition, other than the organic peroxide and the adhesive component, such as a cross-linking aid, a softening agent, a reinforcing agent, a plasticizer, an antioxidant, a tackifier, and a processing aid.

The rubber composition in a liquid form at normal temperature to be used has a viscosity (at normal temperature) of generally at most 10,000 Pa·s, preferably from 500 Pa·s to 5,000 Pa·s as measured with a B-type viscometer.

In addition, an example of the rubber cement is a solvent-based rubber composition containing a rubber component such as an EPM, an EPDM, an acrylonitrile-butadiene rubber (NBR), or a hydrogenated acrylonitrile-butadiene rubber (H-NBR) and the specific cross-linking agent (B) as well as a solvent. A rubber in a solid form at normal temperature (solid rubber) is preferably used as the rubber component.

Further, another example of the material for forming the adhesive layer is a primer containing a copolymerized oligomer (α) of an amino group-containing silane coupling agent and a vinyl group-containing silane coupling agent.

Examples of the amino group-containing silane coupling agent include γ-aminopropyltriethoxysilane, γ-aminopropyltrimethoxysilane, N-β-(aminoethyl)-γ-aminopropyltrimethoxysilane, and N-β-(aminoethyl)-γ-aminopropyltriethoxysilane. One kind of these agents is used alone, or two or more kinds thereof are used in combination. When the amino group-containing silane coupling agent is used as it is as one component of the adhesive layer, film formation cannot be successfully achieved, resulting in failure in imparting satisfactory adhesiveness. Therefore, the amino group-containing silane coupling agent is used as a copolymerized oligomer with a vinyl group-containing alkoxysilane.

In addition, examples of the vinyl group-containing silane coupling agent include vinyltrimethoxysilane and vinyltriethoxysilane. Those vinyl group-containing silane coupling agents are used alone or in combination of two or more kinds. The vinyl group-containing silane coupling agent cannot be mixed with other components because the coupling agent has a poor solubility in water and is separated therefrom owing to being in an oil form. In addition, its oligomer also has a poor solubility in water and is precipitated. Therefore, the vinyl group-containing silane coupling agent is used as an oligomer with the amino group-containing silane coupling agent.

In an oligomerization reaction, the vinyl group-containing silane coupling agent is used in an amount of from 25 parts by weight to 400 parts by weight, preferably from 50 parts by weight to 150 parts by weight, and water for hydrolysis is used in an amount of from 20 parts by weight to 150 parts by weight, with respect to 100 parts by weight of the amino group-containing silane coupling agent. When the amount of the vinyl group-containing silane coupling agent to be blended is too large, there is a tendency that compatibility with the sealing member is reduced and thereby the adhesiveness is reduced. When the amount of the vinyl group-containing silane coupling agent to be blended is too small, water resistance tends to be reduced.

The oligomerization reaction is performed by charging the above-mentioned raw materials (the amino group-containing silane coupling agent, the vinyl group-containing silane coupling agent, water for hydrolysis, and the like) in a reaction vessel including a distillation apparatus and a stirrer, and stirring the raw materials at about 60° C. for about 1 hour. After that, an acid such as formic acid is added thereto in an amount of about from 1 mole to 2 moles with respect to 1 mole of the amino group-containing silane coupling agent within 1 hour. At this time, the temperature is kept at about 65° C. Further, stirring is performed for 1 hour to 5 hours to allow the reaction to proceed, and concurrently an alcohol generated through hydrolysis is distilled away under reduced pressure. The distillation is completed at the time when a distillate contains only water. The resultant is then adjusted by being diluted so that the concentration of silane is from 30 wt % to 80 wt %. Thus, a copolymerized oligomer (α) can be obtained. The copolymerized oligomer (α) is such an oligomer as to be soluble in an alcohol-based organic solvent such as methanol or ethanol. It should be noted that a commercially available product may be directly used as the copolymerized oligomer (α). The copolymerized oligomer (α) is preferably a trimer or a higher oligomer.

The ratio (weight ratio) of an amino group (a) to a vinyl group (b) in the copolymerized oligomer (α), that is the ratio of (a)/(b), falls within a range of preferably from 100/200 to 100/50, particularly preferably from 100/200 to 100/150. The case where the ratio of (b) is higher is preferred because, in such case, the adhesiveness is improved. It should be noted that the amino group (a) is derived from the amino group-containing silane coupling agent, and the vinyl group (b) is derived from the vinyl group-containing silane coupling agent.

Specific examples of the copolymerized oligomer (α) include AP-133 [the weight ratio of an amino group (a) to a vinyl group (b):(a)/(b)=100/186] manufactured by Lord Far East Inc. and Chemlok 607 [the weight ratio of an amino group (a) to a vinyl group (b):(a)/(b)=100/63] manufactured by Lord Far East Inc.

It should be noted that the primer is used as a solution obtained by diluting the copolymerized oligomer (α) with an organic solvent so that the concentration of the copolymerized oligomer (α) is about from 0.5 wt % to 15 wt %, as required. Examples of the organic solvent include: alcohol-based organic solvents such as methanol, ethanol, isopropanol, and 2-ethoxyethanol (ethylene glycol monoethyl ether); and ketone-based organic solvents such as acetone, methyl ethyl ketone, and methyl isobutyl ketone.

<Fuel Cell Sealed Body>

As a fuel cell sealed body of the embodiment of the present invention, there is given a fuel cell sealed body including a constituent member of a fuel cell and the sealing member for sealing the constituent member bonded to each other through an adhesive layer, or a fuel cell sealed body including the sealing members for sealing a constituent member of a fuel cell bonded to each other through an adhesive layer. Alternatively, there is given a fuel cell sealed body including a constituent member of a fuel cell and the sealing member for sealing the constituent member directly bonded to each other without an adhesive layer unlike the above-mentioned case, or a fuel cell sealed body including the sealing members for sealing a constituent member of a fuel cell directly bonded to each other without an adhesive layer.

While the constituent member of a fuel cell to be sealed with the sealing member of the embodiment of the present invention varies depending on the kind, structure, and the like of the fuel cell, examples of the constituent member include a separator (metal separator or the like), a gas diffusion layer (GDL), and a MEA (an electrolyte membrane, an electrode).

An example of the fuel cell sealed body of the embodiment of the present invention is illustrated in FIG. 1. A single cell 1 in a fuel cell in which a plurality of cells are stacked is mainly illustrated in FIG. 1. The cell 1 includes a MEA 2, gas diffusion layers (GDL) 3, sealing members 4a, separators 5, and adhesive layers 6.

As the fuel cell sealed body of the embodiment of the present invention, there is given: for example, the one including the separator 5 and the sealing member 4a bonded to each other through the adhesive layer 6 as illustrated in FIG. 1; one including the MEA 2 and the sealing member 4a bonded to each other through the adhesive layer 6; one including the gas diffusion layer 3 and the sealing member 4a bonded to each other through the adhesive layer 6; and one including the adjacent sealing members 4a bonded to each other through the adhesive layer 6. Alternatively, there is given: one including the separator 5 and the sealing member 4a directly bonded to each other without the adhesive layer 6 in the fuel cell sealed body illustrated in FIG. 1; one including the MEA 2 and the sealing member 4a directly bonded to each other; one including the gas diffusion layer 3 and the sealing member 4a directly bonded to each other; and one including the adjacent sealing members 4a directly bonded to each other.

The MEA 2 includes an electrolyte membrane and a pair of electrodes arranged on both sides of the electrolyte membrane in a stacking direction so as to sandwich the electrolyte membrane (not shown). The electrolyte membrane and the pair of electrodes each have a rectangular thin plate shape. The gas diffusion layers 3 are arranged on both sides of the MEA 2 in the stacking direction so as to sandwich the MEA 2. The gas diffusion layers 3 are each a porous layer having a rectangular thin plate shape.

It is preferred that each of the separators 5 be made of a metal such as titanium. The separator 5 is particularly preferably a metal separator including a carbon thin film such as a diamond like carbon film (DLC film) or a graphite film from the viewpoint of conduction reliability. The separator 5 has a rectangular thin plate shape, and includes a total of six concave grooves each extending in a longitudinal direction. The separator 5 has a section of concave-convex shape by virtue of the grooves. The separators 5 are arranged on both sides of the gas diffusion layers 3 in the stacking direction so as to face each other. Gas flow passages 7 for supplying gases to the electrodes are defied by the gas diffusion layer 3 and the separator 5 by utilizing the concave-convex shape.

Each of the sealing members 4a has a rectangular frame shape. Through the adhesive layer 6, the sealing member 4a is bonded to peripheral portions of the MEA 2 and the gas diffusion layer 3, and the separator 5. Thus, the sealing member 4a seals the peripheral portions of the MEA 2 and the gas diffusion layer 3. It should be noted that, while two pieces of the sealing members 4a separated into an upper one and a lower one are used in the example of FIG. 1, a single sealing member in which the two sealing members are combined may be used.

At the time of operation of a fuel cell such as a polymer electrolyte fuel cell, a fuel gas and an oxidant gas are supplied through the gas flow passages 7. Now, the peripheral portion of the MEA 2 is sealed with the sealing member 4a through the adhesive layer 6. Therefore, the gases are prevented from being mixed with each other or leaking out.

For example, the fuel cell sealed body of the embodiment of the present invention may be produced as described below. First, the sealing member for a fuel cell of the embodiment of the present invention is produced as described above.

On the other hand, for example, the rubber composition serving as the material for forming an adhesive layer is prepared as described below. First, materials other than the organic peroxide (cross-linking agent), the adhesive component, and the cross-linking aid are pre-mixed and kneaded at a temperature of from 80° C. to 140° C. for several minutes. Next, the obtained kneaded product is cooled, and the organic peroxide (cross-linking agent), the adhesive component, and the cross-linking aid as required are added thereto. Then, the mixture is kneaded with a roll such as an open roll at a roll temperature of from 40° C. to 70° C. for 5 minutes to 30 minutes. Thus, the rubber composition is prepared. It should be noted that the adhesive component may be blended at the stage of the pre-mixing.

Next, the rubber composition serving as the material for forming an adhesive layer is applied onto any one or both of the constituent member of a fuel cell such as a metal separator and the sealing member for sealing the constituent member. Thus, the fuel cell sealed body of the embodiment of the present invention including the constituent member of a fuel cell such as a metal separator and the sealing member bonded to each other through the adhesive layer can be obtained.

As a method of applying the rubber composition, there is given, for example, an application method involving using a dispenser. The rubber composition may be generally applied under conditions of normal temperature.

The thickness of the adhesive layer in the fuel cell sealed body of the embodiment of the present invention is generally from 0.01 mm to 0.5 mm, preferably from 0.05 mm to 0.3 mm, in the case of using the rubber composition in a liquid form. Alternatively, in the case of using the primer, the thickness of the adhesive layer is generally from 10 nm to 500 nm, preferably from 30 nm to 200 nm.

Figure 2:
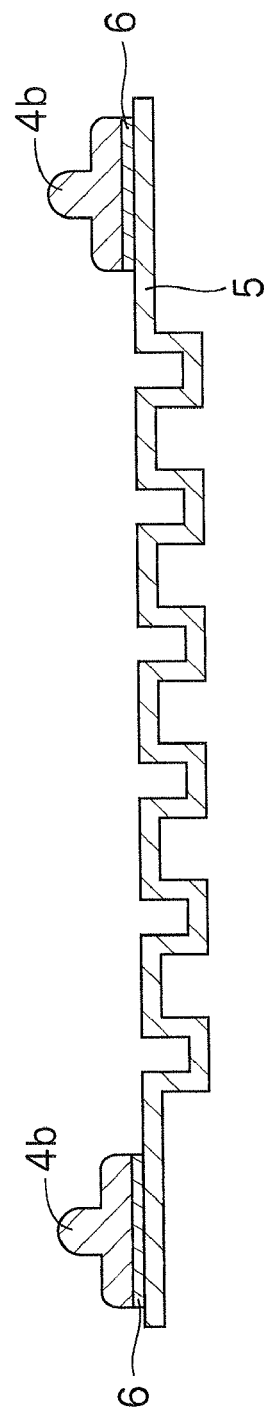
FIG. 2 is a sectional view for illustrating an example of using a sealing member for a fuel cell of the embodiment of the present invention.

Further, another example of using the sealing member for a fuel cell of the embodiment of the present invention is illustrated in FIG. 2. FIG. 2 is an illustration of a member including: the separator 5 described above, which includes a total of six concave grooves each extending in the longitudinal direction and has a rectangular thin plate shape with a section of concave-convex shape; and a lip 4b having a rectangular shape with a section of convex shape, provided in a peripheral portion of the separator 5 through the adhesive layer 6. The sealing member for a fuel cell of the embodiment of the present invention is used as the lip 4b. It should be noted that a material for forming the separator 5 and a material for forming the adhesive layer 6 are the same as those described above. In addition, there is given another embodiment in which, in the member illustrated in FIG. 2, the separator 5 and the lip 4b are directly bonded to each other without the adhesive layer 6.

EXAMPLES

The present invention is hereinafter described in more detail by way of Examples, but the present invention is not limited to the following Examples without departing from the gist of the invention. It should be noted that the "part (s)" and "%" mean values in terms of weight in the following examples unless otherwise specified.

First, prior to Examples and Comparative Examples, the following materials were prepared for rubber compositions.

<<Specific Rubber Component (A)>>

[EPDM (A1)] (for Comparative Examples)
JSR EP27 manufactured by JSR (content of ethylene=54%, amount of diene=5%)

[EPDM (A2)] (for Comparative Examples)
ESPRENE 532 manufactured by Sumitomo Chemical Company (content of ethylene=51%, amount of diene=4%)

[EPDM (A3)] (for Comparative Examples)
Mitsui EPT 4045M manufactured by Mitsui Chemicals, Inc. (content of ethylene=45%, amount of diene=8%)

[EPDM (A4)] (for Examples)
An EPDM was produced as described below. Specifically, a polymerization reaction was continuously performed in an autoclave made of stainless steel having a volume of 10 liters equipped with a stirrer at a pressure of 1 MPa. At this time, from the bottom of the autoclave, hexane as a polymerization solvent was continuously supplied at a rate of 30 kg per hour, ethylene and propylene were continuously supplied at a rate of 1.2 kg per hour and 2.9 kg per hour, respectively, and 5-ethylidene-2-norbornene was continuously supplied at a rate of 190 g per hour. Concurrently, ethyl aluminum sesquichloride and vanadium trichloride as catalysts were continuously supplied at a rate of 11.9 g per hour and 1.0 g per hour, respectively, and hydrogen was used as a molecular weight adjusting agent. The components were copolymerized while the temperature in the autoclave was retained at 30° C. Thus, an intended EPDM (diene component: 5-ethylidene-2-norbornene) was produced. The obtained EPDM was found to have a content of ethylene of 41%, an amount of diene of 14%, a weight-average molecular weight (Mw) of 310,000, a number-average molecular weight (Mn) of 63,000, and a molecular weight distribution (Mw/Mn) of 4.9.

The weight-average molecular weight (Mw), the number-average molecular weight (Mn), and the molecular weight distribution (Mw/Mn) were measured with a gel permeation chromatographic (GPC) apparatus ("150C" type, manufactured by Waters Corporation) at an injection amount of 500 µl, an elution temperature of 135° C., and an elution solvent rate of 1.0 ml/min, after the EPDM was dissolved at a concentration of 1.5 mg/ml in o-dichlorobenzene. The number-average molecular weight (Mn), the weight-average molecular weight (Mw), and the molecular weight distribution (Mw/Mn) were measured and calculated in terms of polystyrene. It should be noted that "SHODEX AT803S" and "SHODEX AT804S" each manufactured by Showa Denko K.K. serially connected to each other and "SHODEX AT805S" and "SHODEX AT807S" each manufactured by Showa Denko K.K. serially connected to each other were each used as a column. In addition, polystyrene manufactured by Tosoh Corporation was used as a molecular weight standard substance.

[EPDM (A5)] (for Examples)
KELTAN 6950 manufactured by LANXESS (content of ethylene=48%, amount of diene=9%)

[EPDM (A6)] (for Examples)
VISTALON 2502 manufactured by ExxonMobil Chemical Company (content of ethylene=48%, amount of diene=4%)

The composition ratio (wt %), the ratio of each diad distribution (mol %), and the ratio of each triad distribution (mol %) in the EPDMs (A1) to (A6) are summarized in Table 1 below. It should be noted that the ratio of each diad distribution (mol %) and the ratio of each triad distribution (mol %) were measured and calculated based on the above-mentioned method.

TABLE 1

| | Composition ratio (wt %) | | | Ratio of diad distribution (mol %) | | | Ratio of triad distribution (mol %) | | | | | |
|---|---|---|---|---|---|---|---|---|---|---|---|---|
| | Ethylene | Propylene | Diene component | PP | EP | EE | PPP | PPE | EPE | PEP | EEP | EEE |
| EPDM(A1) | 54 | 41 | 5 | 12 | 54 | 34 | 3 | 10 | 18 | 8 | 31 | 30 |
| EPDM(A2) | 51 | 45 | 4 | 7 | 60 | 33 | 3 | 10 | 19 | 8 | 32 | 29 |
| EPDM(A3) | 45 | 47 | 8 | 23 | 47 | 30 | 11 | 15 | 11 | 8 | 27 | 28 |
| EPDM(A4) | 41 | 45 | 14 | 25 | 49 | 26 | 8 | 18 | 12 | 8 | 29 | 25 |
| EPDM(A5) | 48 | 43 | 9 | 12 | 64 | 24 | 5 | 12 | 19 | 10 | 32 | 22 |
| EPDM(A6) | 48 | 48 | 4 | 13 | 67 | 21 | 4 | 12 | 22 | 14 | 29 | 18 |

PP: Propylene-propylene diad
EP: Ethylene-propylene diad
EE: Ethylene-ethylene diad
PPP: Propylene-propylene-propylene triad
PPE: Propylene-propylene-ethylene triad
EPE: Ethylene-propylene-ethylene triad
PEP: Propylene-ethylene-propylene triad
EEP: Ethylene-ethylene-propylene triad
EEE: Ethylene-ethylene-ethylene triad <<Cross-Linking Agent (B)>>

[Peroxyketal (B1)]
1,1-Di(t-butylperoxy)cyclohexane (manufactured by NOF Corporation, PERHEXA C-40, purity: 40%, 1 hour half-life temperature=111.1° C.)

[Dialkyl Peroxide (B2)]
PERHEXYNE 25B manufactured by NOF Corporation, purity: 40%, 1 hour half-life temperature=149.9° C.)

<<Adhesive Component (C)>>
[Resorcinol-Based Compound (C1)]
TACKIROL 620 manufactured by Taoka Chemical Co., Ltd.
[Melamine-Based Compound (C2)]
SUMIKANOL 507AP manufactured by Sumitomo Chemical Company
[Silane Coupling Agent (C3)]
3-Glycidoxypropyltrimethoxysilane (manufactured by Shin-Etsu Chemical Co., Ltd., KBM403)
<<Cross-linking Aid (D)>>
Maleimide compound (manufactured by Ouchi Shinko Chemical Industrial Co., Ltd., VULNOC PM)
<<Softening Agent (E)>>
Poly-α-olefin compound [manufactured by Exxon Mobil Corporation, SPECTRASYN 4 (pour point=−60° C.)]
<<Reinforcing Agent (F)>>
Carbon black (GPF grade) (manufactured by Cabot Japan K.K., Shoblack IP200)

Examples 1 to 7 and 9 to 11, and Comparative Examples 1 to 3

(Production of Vulcanized Rubber for Sealing Member)

Components shown in Tables 2 and 3 below were blended at ratios shown in the Tables, to prepare a rubber composition. Specifically, of the components shown in Tables 2 and 3, the rubber component (A), the softening agent (E), and the reinforcing agent (F) were first kneaded in a Banbury mixer at 120° C. for 5 minutes. After the kneaded product was cooled, the cross-linking agent (B), the adhesive component (C), and the cross-linking aid (D) were added thereto, and the mixture was kneaded with an open roll at 50° C. for 10 minutes. Thus, the rubber composition was prepared. Then, the obtained rubber composition was cross-linked by being retained at 150° C. for 10 minutes, and a rubber piece was cut out therefrom. Thus, a vulcanized rubber (thickness: 5 mm, size: 25 mm×60 mm) serving as the sealing member was produced.

Example 8

Components shown in Table 2 were blended at ratios shown in the Table, to prepare a rubber composition. Specifically, of the components shown in Table 2, the rubber component (A), the softening agent (E), and the reinforcing agent (F) were first kneaded in a Banbury mixer at 120° C. for 5 minutes. After the kneaded product was cooled, the cross-linking agent (B), the adhesive component (C), and the cross-linking aid (D) were added thereto, and the mixture was kneaded with an open roll at 50° C. for 10 minutes. Thus, the rubber composition was prepared. Then, the obtained rubber composition was cross-linked by being retained at 190° C. for 10 minutes, and a rubber piece was cut out therefrom. Thus, a vulcanized rubber (thickness: 5 mm, size: 25 mm×60 mm) serving as the sealing member was produced.

TABLE 2

| (Part(s)) | Example | | | | | | | |
|---|---|---|---|---|---|---|---|---|
| | 1 | 2 | 3 | 4 | 5 | 6 | 7 | 8 |
| EPDM(A1) | — | — | — | — | — | — | — | — |
| EPDM(A2) | — | — | — | — | — | — | — | — |
| EPDM(A3) | — | — | — | — | — | — | — | — |
| EPDM(A4) | 100 | — | — | — | — | — | — | — |
| EPDM(A5) | — | 100 | 100 | 100 | 100 | 100 | — | 100 |
| EPDM(A6) | — | — | — | — | — | — | 100 | — |
| Peroxyketal (B1) | 5 | 5 | 5 | 5 | 2 | 15 | 5 | — |
| Dialkylperoxide (B2) | — | — | — | — | — | — | — | 5 |
| Resorcinol-based compound (C1) | 2 | 2 | — | — | — | — | — | — |
| Melamine-based compound (C2) | 1.5 | 1.5 | — | — | — | — | — | — |
| Silane coupling agent (C3) | 3 | 3 | — | — | — | — | — | — |
| Maleimide compound (D) | 1.5 | 1.5 | 1.5 | 2.5 | 2.5 | 2.5 | 1.5 | 1.5 |
| Poly-α-olefin compound (E) | 20 | 20 | 20 | 20 | 20 | 20 | 20 | 20 |
| Carbon black (F) | 45 | 45 | 45 | 45 | 45 | 45 | 45 | 45 |
| 100% modulus (MPa) | 2.7 | 2.9 | 3.2 | 6.6 | 2.4 | 9.5 | 3.0 | 6.6 |
| Tensile strength (index) | 85 | 90 | 100 | 100 | 85 | 130 | 80 | 100 |
| Elongation at break (index) | 60 | 65 | 50 | 45 | 65 | 30 | 55 | 40 |
| TR test (index) | 260 | 280 | 290 | 300 | 250 | 320 | 285 | 310 |
| Compression set at −30° C. × 24 hr (index) | 30 | 28 | 23 | 20 | 35 | 15 | 33 | 18 |
| Compression set at 100° C. × 24 hr (index) | 28 | 28 | 19 | 14 | 25 | 7 | 23 | 12 |

TABLE 3

| (Part(s)) | Example | | | Comparative Example | | |
|---|---|---|---|---|---|---|
| | 9 | 10 | 11 | 1 | 2 | 3 |
| EPDM(A1) | — | — | — | 100 | — | — |
| EPDM(A2) | — | — | — | — | 100 | — |
| EPDM(A3) | — | — | — | — | — | 100 |
| EPDM(A4) | 100 | — | — | — | — | — |
| EPDM(A5) | — | 100 | 100 | — | — | — |

TABLE 3-continued

| (Part(s)) | | | | | | |
|---|---|---|---|---|---|---|
| | Example | | | Comparative Example | | |
| | 9 | 10 | 11 | 1 | 2 | 3 |
| EPDM(A6) | — | — | — | — | — | — |
| Peroxyketal (B1) | 5 | 5 | 5 | 5 | 5 | 5 |
| Dialkylperoxide (B2) | — | — | — | — | — | — |
| Resorcinol-based compound (C1) | 2 | — | — | 2 | 2 | 2 |
| Melamine-based compound (C2) | 1.5 | — | — | 1.5 | 1.5 | 1.5 |
| Silane coupling agent (C3) | — | — | — | 3 | 3 | 3 |
| Maleimide compound (D) | 1.5 | — | 1.5 | 0.5 | 1.5 | 1.5 |
| Poly-α-olefin compound (E) | 20 | 20 | — | 20 | 20 | 20 |
| Carbon black (F) | 45 | 45 | 30 | 45 | 45 | 45 |
| 100% modulus (MPa) | 3.2 | 1.8 | 3.4 | 1.8 | 2.0 | 2.0 |
| Tensile strength (index) | 95 | 80 | 120 | 100 | 80 | 80 |
| Elongation at break (index) | 50 | 100 | 45 | 100 | 60 | 60 |
| TR test (index) | 275 | 250 | 270 | 100 | 200 | 230 |
| Compression set at −30° C. × 24 hr (index) | 28 | 32 | 25 | 100 | 60 | 56 |
| Compression set at 100° C. × 24 hr (index) | 24 | 34 | 21 | 100 | 45 | 45 |

The vulcanized rubbers obtained as described above were used and evaluated for various characteristics based on the following standards. The results are also shown in Tables 2 and 3.

[100% Modulus]

A JIS No. 5 dumbbell-shaped sample was punched out from each of the vulcanized rubbers, and measured for a 100% modulus in accordance with JIS K6251 (2010).

[Tensile Strength]

The obtained vulcanized rubbers were each used and measured for tensile strength as described below. Specifically, a JIS No. 5 dumbbell-shaped sample was punched out from the vulcanized rubber, and measured for tensile strength in accordance with JIS K6251 (2010). It should be noted that, in Tables 2 and 3, the tensile strength of the vulcanized rubber is shown as an index based on the tensile strength of the vulcanized rubber of Comparative Example 1 as a benchmark (100). That is, the index of the tensile strength was calculated by the following equation.

Index of tensile strength=(Tensile strength of vulcanized rubber of each example)/(Tensile strength of vulcanized rubber of Comparative Example 1)×100

[Elongation at Break]

The obtained vulcanized rubbers were each used and measured for elongation at break as described below. Specifically, a JIS No. 5 dumbbell-shaped sample was punched out from the vulcanized rubber, and measured for elongation at break in accordance with JIS K6251 (2010). It should be noted that, in Tables 2 and 3, the elongation at break of the vulcanized rubber is shown as an index based on the elongation at break of the vulcanized rubber of Comparative Example 1 as a benchmark (100). That is, the index of the elongation at break was calculated by the following equation.

Index of elongation at break=(Elongation at break of vulcanized rubber of each example)/(Elongation at break of vulcanized rubber of Comparative Example 1)×100

[TR Test]

The obtained vulcanized rubbers were each used and measured for a TR value at −30° C. in accordance with JIS K6261. It should be noted that, in Tables 2 and 3, the TR value of the vulcanized rubber is shown as an index based on the TR value of the vulcanized rubber of Comparative Example 1 as a benchmark (100). That is, the index of the TR value was calculated by the following equation.

Index of TR value=(TR value of vulcanized rubber of each example)/(TR value of vulcanized rubber of Comparative Example 1)×100

[Compression Set Test]

The obtained vulcanized rubbers were each subjected to a compression set test in accordance with JIS K6262 (2006). As the compression set test, two kinds of tests of a low temperature test at −30° C. and a high temperature test at 100° C. were performed. First, in the low temperature test at −30° C., the vulcanized rubber was compressed at −30° C. for 24 hours and then released. Its thickness was measured after a lapse of 30 minutes at the temperature, and the compression set was calculated. On the other hand, in the high temperature test at 100° C., the vulcanized rubber was compressed at 100° C. for 24 hours and then released. Its thickness was measured after a lapse of 30 minutes at room temperature (25° C.), and the compression set was calculated. A compression rate was set to 25% in both the tests. The measurement results are summarized in Tables 2 and 3. It should be noted that, in Tables 2 and 3, the compression set of the vulcanized rubber is shown as an index based on the compression set of the vulcanized rubber of Comparative Example 1 as a benchmark (100) in both the cases of −30° C. and 100° C. That is, the index of the compression set was calculated by the following equation.

Index of compression set=(Compression set of vulcanized rubber of each example)/(Compression set of vulcanized rubber of Comparative Example 1)×100

As is apparent from the results shown in Tables 2 and 3, the products of Examples each had satisfactory results in the TR test at −30° C. and the compression set at −30° C. as well as the compression set at 100° C., because the EPDM having a ratio of ethylene-ethylene diad distribution equal to or less than the specific value was used in the rubber composition serving as a material for forming the sealing member (vulcanized rubber). This reveals that the crystallization of the polymer is suppressed even under extremely low temperature conditions, and the sealing member for a fuel cell can exhibit excellent sealing performance.

It should be noted that, even in the case of using an EPM instead of the EPDM in the rubber composition serving as the material for forming the sealing member, evaluation results at substantially the same levels as those in the case of using the EPDM were obtained.

In contrast, as compared to the results of the products of Examples, the products of Comparative Examples each had poor results in the TR test at −30° C. and the compression set at −30° C. as well as the compression set at 100° C., because the EPDM having a ratio of ethylene-ethylene diad distribution exceeding the specific value was used.

Specific modes in the present invention have been described in the foregoing Examples, but the foregoing Examples are merely illustrative and should not be construed as being limitative. Various modifications apparent to a person skilled in the art are intended to fall within the scope of the present invention.

The sealing member for a fuel cell of the embodiment of the present invention is used in a fuel cell sealed body as a rubber sealing member for sealing a constituent member of a fuel cell such as a metal separator, the fuel cell sealed body including the constituent member and the sealing member bonded to each other through an adhesive layer, or including the sealing members bonded to each other through an adhesive layer. Alternatively, the sealing member for a fuel cell of the embodiment of the present invention is used in a fuel cell sealed body as a rubber sealing member for sealing a constituent member of a fuel cell such as a metal separator, the fuel cell sealed body including the constituent member and the sealing member directly bonded to each other, or including the sealing members directly bonded to each other.

What is claimed is:

1. A sealing member for a fuel cell to be used for sealing a constituent member of a fuel cell, the sealing member comprising a cross-linked product of a rubber composition,
   wherein the rubber composition contains the following components (A) and (B):
   (A) a rubber component comprising at least one of an ethylene-propylene rubber or ethylene-propylene-diene rubber having a ratio of ethylene-ethylene diad distribution in a range of 15 to 29 mol %; and
   (B) a cross-linking agent comprising an organic peroxide.

2. The sealing member for a fuel cell according to claim 1, wherein the rubber component (A) comprises a rubber component comprising at least one of an ethylene-propylene rubber or ethylene-propylene-diene rubber having a ratio of ethylene-ethylene-ethylene triad distribution of at most 27 mol %.

3. The sealing member for a fuel cell according to claim 1, wherein the organic peroxide has a 1 hour half-life temperature of at most 160° C.

4. The sealing member for a fuel cell according to claim 1, wherein the rubber composition further contains the following component (C) in addition to the components (A) and (B):
   (C) at least one adhesive component selected from the group consisting of a resorcinol-based compound, a melamine-based compound, an aluminate-based coupling agent, and a silane coupling agent.

5. The sealing member for a fuel cell according to claim 1, wherein the rubber composition further contains the following component (D):
   (D) a cross-linking aid.

6. The sealing member for a fuel cell according to claim 1, wherein the rubber component (A) comprises an ethylene-propylene-diene rubber, and the amount of diene in the ethylene-propylene-diene rubber is from 3 wt % to 15 wt %.

7. The sealing member for a fuel cell according to claim 1, wherein the rubber composition further contains a softening agent having a pour point of at most −40° C.

8. The sealing member for a fuel cell according to claim 7, wherein the softening agent having a pour point of at most −40° C. is a poly-α-olefin.

9. A fuel cell sealed body, comprising the sealing member of claim 1 bonded, through an adhesive layer, to a constituent member of a fuel cell, or comprising at least two sealing members of claim 1 bonded to each other through an adhesive layer.

10. A fuel cell sealed body, comprising the sealing member of claim 1 directly bonded to a constituent member of a fuel cell, or comprising at least two sealing members of claim 1 directly bonded to each other.

11. The fuel cell sealed body according to claim 9, wherein the constituent member of a fuel cell comprises at least one member selected from the group consisting of a metal separator, a membrane electrode assembly, and a gas diffusion layer.

12. The sealing member for a fuel cell according to claim 1, wherein the rubber component (A) has a content of ethylene in a range of 40 to 53 wt %.

* * * * *